US010502425B2

(12) United States Patent
Boardman et al.

(10) Patent No.: US 10,502,425 B2
(45) Date of Patent: Dec. 10, 2019

(54) CONTOURED SHROUD SWIRLING PRE-MIX FUEL INJECTOR ASSEMBLY

(71) Applicant: General Electric Company, Schenectady, NY (US)

(72) Inventors: Gregory Allen Boardman, Liberty Township, OH (US); Pradeep Naik, Bangalore (IN); Joseph Zelina, Waynesville, OH (US)

(73) Assignee: General Electric Company, Schenectady, NY (US)

( * ) Notice: Subject to any disclaimer, the term of this patent is extended or adjusted under 35 U.S.C. 154(b) by 531 days.

(21) Appl. No.: 15/172,590

(22) Filed: Jun. 3, 2016

(65) Prior Publication Data

US 2017/0350598 A1    Dec. 7, 2017

(51) Int. Cl.
*F23R 3/28* (2006.01)
*F02C 7/22* (2006.01)
*F23R 3/16* (2006.01)
*F23R 3/14* (2006.01)

(52) U.S. Cl.
CPC .............. *F23R 3/286* (2013.01); *F02C 7/222* (2013.01); *F23R 3/14* (2013.01); *F23R 3/16* (2013.01); *Y02T 50/675* (2013.01)

(58) Field of Classification Search
CPC .... F23R 3/286; F23R 3/32; F23R 3/36; F23R 3/38; F23R 3/42; F23R 3/46; F23R 3/50; F23R 3/56; F23R 3/58; F23R 3/14; F23R 3/16; F02C 7/222; Y02T 50/675; F23C 7/004
See application file for complete search history.

(56) References Cited

U.S. PATENT DOCUMENTS

| 3,703,259 A | * | 11/1972 | Sturgess | F23D 11/10 239/400 |
| 3,866,413 A | * | 2/1975 | Sturgess | F23R 3/36 239/400 |
| 4,170,108 A | * | 10/1979 | Mobsby | F23R 3/28 239/400 |
| 4,600,151 A | * | 7/1986 | Bradley | F23D 11/107 239/400 |

(Continued)

FOREIGN PATENT DOCUMENTS

| EP | 1 391 653 A2 | 2/2004 |
| WO | 2008/071902 A1 | 6/2008 |

OTHER PUBLICATIONS

International Search Report and Written Opinion issued in connection with corresponding PCT Application No. PCT/US2017/035761 dated Nov. 24, 2017.

*Primary Examiner* — Lorne E Meade
(74) *Attorney, Agent, or Firm* — Dority & Manning, P.A.

(57) ABSTRACT

The present disclosure is directed to a fuel injector assembly of a gas turbine engine, including a centerbody, an outer sleeve surrounding the centerbody, an inner sleeve disposed between the centerbody and at least a section of the outer sleeve, and at least one axially oriented vane defined between the centerbody and a section of the inner sleeve. A section of the outer sleeve includes at least one radially oriented vane. A portion of the inner sleeve includes a contoured shroud and defines at least one fuel injection port disposed upstream of the contoured shroud. The axially oriented vane is disposed upstream of the fuel injection port.

15 Claims, 10 Drawing Sheets

(56) References Cited

U.S. PATENT DOCUMENTS

| | | | |
|---|---|---|---|
| 4,689,961 A | 9/1987 | Stratton | |
| 5,207,064 A | 5/1993 | Ciokajlo et al. | |
| 5,351,477 A * | 10/1994 | Joshi | F23C 7/004 |
| | | | 239/400 |
| 5,359,847 A * | 11/1994 | Pillsbury | F23D 17/002 |
| | | | 60/39.463 |
| 5,408,825 A * | 4/1995 | Foss | F23D 17/002 |
| | | | 60/39.463 |
| 5,511,375 A | 4/1996 | Joshi et al. | |
| 5,622,054 A | 4/1997 | Tingle | |
| 5,657,632 A * | 8/1997 | Foss | F23D 17/002 |
| | | | 239/416.4 |
| 5,778,676 A * | 7/1998 | Joshi | F23D 11/101 |
| | | | 239/405 |
| 6,021,635 A * | 2/2000 | Gaag | F23R 3/36 |
| | | | 239/400 |
| 6,367,262 B1 * | 4/2002 | Mongia | F23R 3/14 |
| | | | 60/748 |
| 6,381,964 B1 * | 5/2002 | Pritchard, Jr. | F23R 3/14 |
| | | | 60/746 |
| 6,389,815 B1 * | 5/2002 | Hura | F23R 3/346 |
| | | | 60/746 |
| 6,418,726 B1 * | 7/2002 | Foust | F23R 3/14 |
| | | | 60/748 |
| 6,474,071 B1 * | 11/2002 | Durbin | F23R 3/14 |
| | | | 239/405 |
| 6,484,489 B1 * | 11/2002 | Foust | F23R 3/14 |
| | | | 60/732 |
| 6,532,726 B2 | 3/2003 | Norster | F23C 7/002 |
| | | | 60/39.281 |
| 6,715,292 B1 * | 4/2004 | Hoke | F23D 11/107 |
| | | | 239/404 |
| 6,834,505 B2 * | 12/2004 | Al-Roub | F23R 3/14 |
| | | | 60/737 |
| 6,883,332 B2 * | 4/2005 | Steinthorsson | F23D 11/107 |
| | | | 60/740 |
| 7,059,135 B2 * | 6/2006 | Held | F23R 3/14 |
| | | | 60/748 |
| 7,086,234 B2 * | 8/2006 | Doerr | F23R 3/14 |
| | | | 60/737 |
| 7,464,553 B2 * | 12/2008 | Hsieh | F23R 3/14 |
| | | | 60/740 |
| 7,596,949 B2 * | 10/2009 | DeVane | F23R 3/002 |
| | | | 60/748 |
| 7,631,500 B2 * | 12/2009 | Mueller | F23R 3/286 |
| | | | 239/399 |
| 7,658,075 B2 * | 2/2010 | von der Bank | F23D 11/107 |
| | | | 60/737 |
| 7,677,026 B2 | 3/2010 | Conete et al. | |
| 7,779,636 B2 * | 8/2010 | Buelow | F23R 3/14 |
| | | | 60/742 |
| 7,878,000 B2 * | 2/2011 | Mancini | F23R 3/14 |
| | | | 60/737 |
| 7,926,744 B2 * | 4/2011 | Thomson | F23R 3/28 |
| | | | 239/405 |
| 7,942,003 B2 * | 5/2011 | Baudoin | F23R 3/343 |
| | | | 60/747 |
| 8,001,761 B2 * | 8/2011 | Myers, Jr. | F02C 9/28 |
| | | | 60/39.281 |
| 8,161,751 B2 | 4/2012 | Hall | |
| 8,316,644 B2 | 11/2012 | Wilbraham | |
| 8,327,643 B2 * | 12/2012 | Yamamoto | F23R 3/343 |
| | | | 239/403 |
| 8,365,531 B2 * | 2/2013 | Pidcock | F23D 11/107 |
| | | | 60/737 |
| 8,511,087 B2 | 8/2013 | Fox et al. | |
| 8,528,337 B2 | 9/2013 | Berry et al. | |
| 8,938,971 B2 | 1/2015 | Poyyapakkam et al. | |
| 8,959,921 B2 * | 2/2015 | Khan | F23R 3/04 |
| | | | 60/737 |
| 9,109,553 B2 * | 8/2015 | Matsuyama | F02M 23/12 |
| 9,115,896 B2 * | 8/2015 | Abdel-Hafez | F23C 7/004 |
| 9,169,779 B2 * | 10/2015 | Winter | F02C 7/042 |
| 9,188,341 B2 * | 11/2015 | McMasters | F02K 9/52 |
| 9,303,876 B2 * | 4/2016 | Hernandez | F23R 3/14 |
| 9,310,082 B2 * | 4/2016 | Kraemer | F23R 3/14 |
| 9,322,559 B2 * | 4/2016 | Pinson | F23R 3/286 |
| 9,423,133 B2 * | 8/2016 | Gomez del Campo | F23R 3/14 |
| 9,435,537 B2 * | 9/2016 | Elkady | F23R 3/14 |
| 9,482,433 B2 * | 11/2016 | Lee | F23R 3/286 |
| 9,739,161 B2 * | 8/2017 | Gregory | F23R 3/14 |
| 9,939,157 B2 * | 4/2018 | Patel | F23R 3/286 |
| 10,001,281 B2 * | 6/2018 | Patel | F23R 3/286 |
| 10,132,499 B2 * | 11/2018 | Matsuyama | F23R 3/14 |
| 10,197,270 B2 * | 2/2019 | Arakawa | F23D 14/24 |
| 2002/0162333 A1 * | 11/2002 | Zelina | F23R 3/14 |
| | | | 60/776 |
| 2003/0221429 A1 * | 12/2003 | Laing | F23D 11/36 |
| | | | 60/740 |
| 2005/0198965 A1 * | 9/2005 | Henriquez | F23R 3/16 |
| | | | 60/740 |
| 2006/0059915 A1 * | 3/2006 | Furletov | F23D 11/24 |
| | | | 60/740 |
| 2007/0289305 A1 * | 12/2007 | Oda | F23D 11/383 |
| | | | 60/748 |
| 2009/0056338 A1 * | 3/2009 | Cazalens | F23R 3/50 |
| | | | 60/746 |
| 2009/0173076 A1 * | 7/2009 | Toon | F23D 14/74 |
| | | | 60/746 |
| 2010/0050644 A1 * | 3/2010 | Pidcock | F23D 11/107 |
| | | | 60/737 |
| 2010/0050646 A1 * | 3/2010 | Lovett | F23D 11/104 |
| | | | 60/742 |
| 2010/0269506 A1 * | 10/2010 | Nonaka | F23D 11/386 |
| | | | 60/742 |
| 2012/0131923 A1 | 5/2012 | ElKady et al. | |
| 2012/0234013 A1 * | 9/2012 | Overman | F23C 9/006 |
| | | | 60/772 |
| 2012/0285173 A1 * | 11/2012 | Poyyapakkam | F23C 7/004 |
| | | | 60/772 |
| 2012/0292408 A1 * | 11/2012 | Short | F23D 11/103 |
| | | | 239/463 |
| 2012/0297787 A1 * | 11/2012 | Poyyapakkam | B01F 5/0451 |
| | | | 60/772 |
| 2013/0067920 A1 * | 3/2013 | Fox | F23R 3/14 |
| | | | 60/738 |
| 2013/0145765 A1 * | 6/2013 | Patel | F23R 3/14 |
| | | | 60/737 |
| 2014/0060060 A1 | 3/2014 | Bernero et al. | |
| 2014/0090400 A1 * | 4/2014 | Stuttaford | F23R 3/16 |
| | | | 60/796 |
| 2014/0096502 A1 * | 4/2014 | Karlsson | F23K 5/12 |
| | | | 60/39.59 |
| 2014/0174096 A1 * | 6/2014 | Milosavljevic | F23D 11/38 |
| | | | 60/776 |
| 2014/0331678 A1 * | 11/2014 | Cramer | F23R 3/10 |
| | | | 60/746 |
| 2015/0128607 A1 | 5/2015 | Lee | |
| 2015/0323187 A1 * | 11/2015 | Gomez del Campo | |
| | | | F02C 7/264 |
| | | | 60/776 |
| 2016/0010856 A1 | 1/2016 | Biagioli et al. | |
| 2016/0061452 A1 * | 3/2016 | Walker | F23R 3/286 |
| | | | 60/737 |
| 2016/0084169 A1 * | 3/2016 | Stuttaford | F02C 7/228 |
| | | | 60/776 |
| 2016/0265779 A1 * | 9/2016 | Haynes | F23R 3/286 |
| 2016/0265780 A1 * | 9/2016 | Patel | F23R 3/283 |
| 2016/0290238 A1 * | 10/2016 | Loeffel | F23R 3/20 |
| 2016/0313007 A1 * | 10/2016 | Martini | F23R 3/04 |
| 2017/0363291 A1 * | 12/2017 | Laster | F23R 3/14 |
| 2018/0372319 A1 * | 12/2018 | Matsuyama | F23R 3/14 |

* cited by examiner

CONTOURED SHROUD SWIRLING PRE-MIX FUEL INJECTOR ASSEMBLY

FIELD OF THE INFORMATION

The present subject matter relates generally to gas turbine engine combustion assemblies. More particularly, the present subject matter relates to a contoured premixing fuel injector assembly for gas turbine engine combustors.

BACKGROUND OF THE INVENTION

Aircraft and industrial gas turbine engines include a combustor in which fuel is burned to input heat to the engine cycle. Typical combustors incorporate one or more fuel injectors whose function is to introduce liquid or gaseous fuel into an air flow stream so that it can atomize and burn. Gas turbine engines may operate using one or several types or combinations of fuel, such as propane, ethane, hydrogen, or jet fuel.

Fuel nozzles, as part of fuel injector assemblies in combustors, have been developed to operate in staged combustors with low pollution, high efficiency, low cost, high engine output, and good engine operability. In a staged combustor, the fuel nozzles of the combustor are operable to selectively inject fuel through two or more discrete stages, each stage being defined by individual fuel flow paths within the fuel nozzle. For example, the fuel nozzle may include a pilot stage that operates continuously and a main stage that only operates at higher engine power levels. Additionally, a fuel nozzle will have one or several features for mixing air and fuel before ignition.

Operating combustors with relatively high reactivity fuels (e.g. propane, ethane, or hydrogen) are limited by issues such as auto-ignition, flashback, and flame-holding. While preventing or eliminating such issues, the need exists for delivering high fuel-air premixing to the combustor for good combustion performance and engine operability across all engine loads.

BRIEF DESCRIPTION OF THE INVENTION

Aspects and advantages of the invention will be set forth in part in the following description, or may be obvious from the description, or may be learned through practice of the invention.

The present disclosure is directed to a fuel injector assembly of a gas turbine engine, including a centerbody, an outer sleeve surrounding the centerbody, an inner sleeve disposed between the centerbody and at least a section of the outer sleeve, and at least one axially oriented vane defined between the centerbody and a section of the inner sleeve. A section of the outer sleeve includes at least one radially oriented vane. A portion of the inner sleeve includes a contoured shroud and defines at least one fuel injection port disposed upstream of the contoured shroud. The axially oriented vane is disposed upstream of the fuel injection port.

A further aspect of the present disclosure is directed to a fuel nozzle that includes a centerbody, an outer sleeve, an inner sleeve, and at least one axially oriented vane defined between the centerbody and a section of the inner sleeve. The outer sleeve is at least partially surrounding the axial length of the centerbody. The inner sleeve is disposed radially outward of the centerbody. A portion of the inner sleeve includes a contoured shroud. The inner sleeve and the outer sleeve define at least one fuel injection port disposed upstream of at least one contoured shroud. The axially oriented vane is disposed upstream of the fuel injection port.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
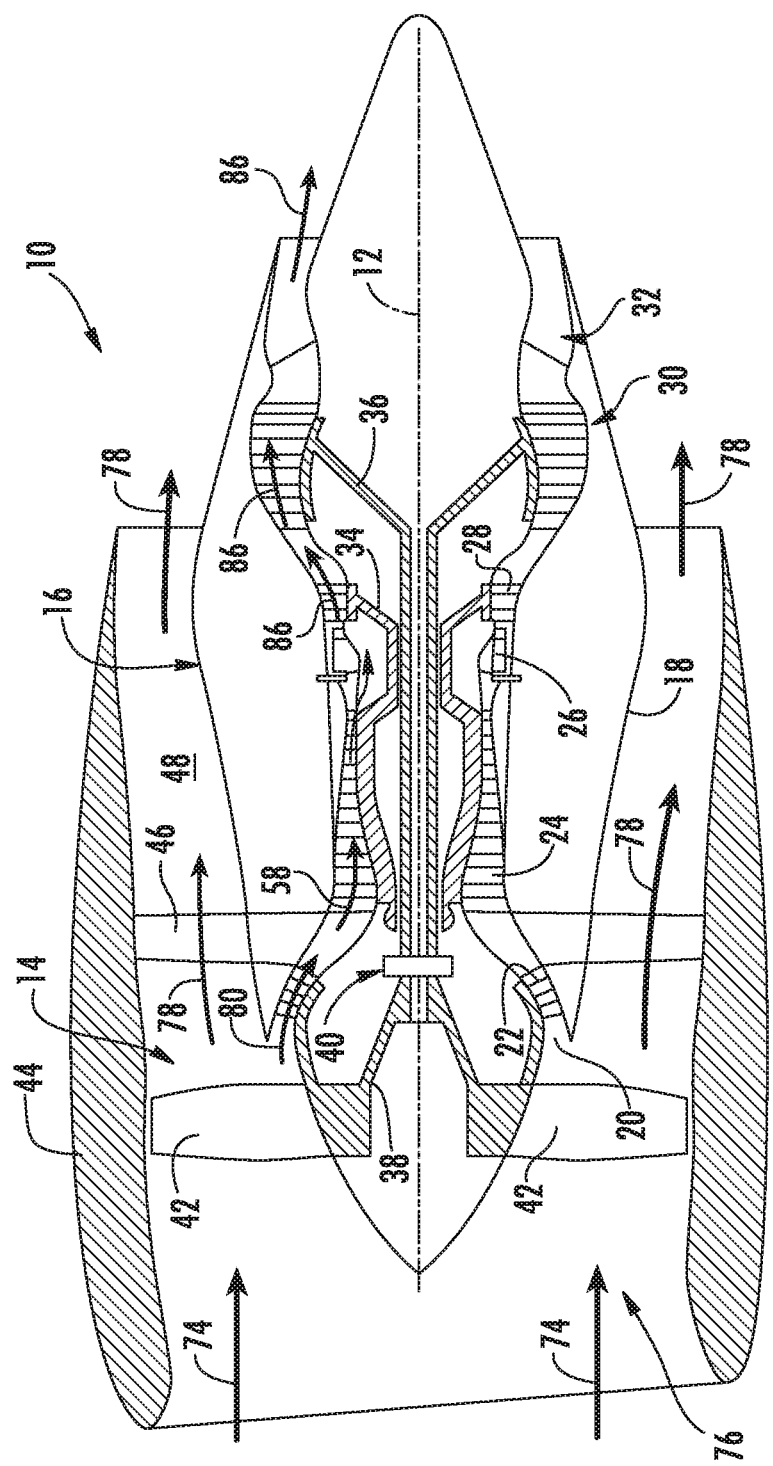
FIG. 1 is a schematic cross-sectional view of an exemplary high-bypass turbofan jet engine.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

A pre-swirling fuel nozzle is generally provided that incorporates a contoured shroud of a lobed structure. Such a pre-swirling fuel nozzle may provide high levels of fuel-air pre-mixing for fluid fuels (e.g., liquid or gaseous fuels) with high-reactivity fuels (e.g. propane, ethane, or hydrogen, or mixtures thereof) before delivering the fuel-air pre-mixture to the combustion chamber. Additionally, auto-ignition, flameholding, and flashback may be sufficiently mitigated while delivering high levels of fuel-air pre-mixing. The serial combination of a swirler, a fuel injection port sized for liquid or gaseous fuels, a contoured shroud of a lobed structure, and an additional swirler may deliver fuel away from wakes or boundary layers of swirler vanes, pegs, or inner and outer annular walls. Additionally, a converging annular duct area may accelerate a fuel-air mixture to thin wall boundary layers to further reduce flashback and flameholding risks. Furthermore, a fuel injection port arranged with a contoured shroud of a lobed structure may augment fuel-air mixing by increasing vorticity without creating recirculating wake zones. Combinations of contoured-shroud and fuel injection port geometries may be varied to abate undesired noise, vibration, or harmonic modes associated with heat release variation in a combustor.

Altogether, the serial combination of a swirler, a fuel injection port, a contoured shroud, and another swirler may lower gas turbine emissions and provide better controllability against undesired combustor tones while increasing operational fuel flexibility. The combination may be operated with a variety of fuels including, but not limited to, propane, ethane, coke oven gas, natural gas, synthesis gas, liquid fuel, or mixtures thereof. For example, the combination may operate with fuels of up to 100% propone or ethane, or fuels of up to about 60% hydrogen, or MWI fuels less than about 25, or synthesis gas of up to 100% carbon monoxide and hydrogen, or fuel mixtures of up to about 60% nitrogen content. Although further described below with reference to a turbofan engine 10, the present disclosure is also applicable to turbomachinery in general, including turbojet, turboprop and turboshaft gas turbine engines, including industrial and marine gas turbine engines and auxiliary power units.

Referring now to the drawings, FIG. 1 is a schematic partially cross-sectioned side view of an exemplary high by-pass turbofan jet engine 10 herein referred to as "turbofan 10" as may incorporate various embodiments of the present invention. As shown in FIG. 1, the turbofan 10 has a longitudinal or axial centerline axis 12 that extends there through for reference purposes. In general, the turbofan 10 may include a fan assembly 14 and a core turbine engine or gas turbine engine 16 disposed downstream from the fan assembly 14.

The gas turbine engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the gas turbine engine 16. It should be appreciated by those of ordinary skill in the art that the nacelle 44 may be configured to be supported relative to the gas turbine engine 16 by a plurality of circumferentially-spaced outlet guide vanes or struts 46. Moreover, at least a portion of the nacelle 44 may extend over an outer portion of the gas turbine engine 16 so as to define a bypass airflow passage 48 therebetween.

Figure 2:
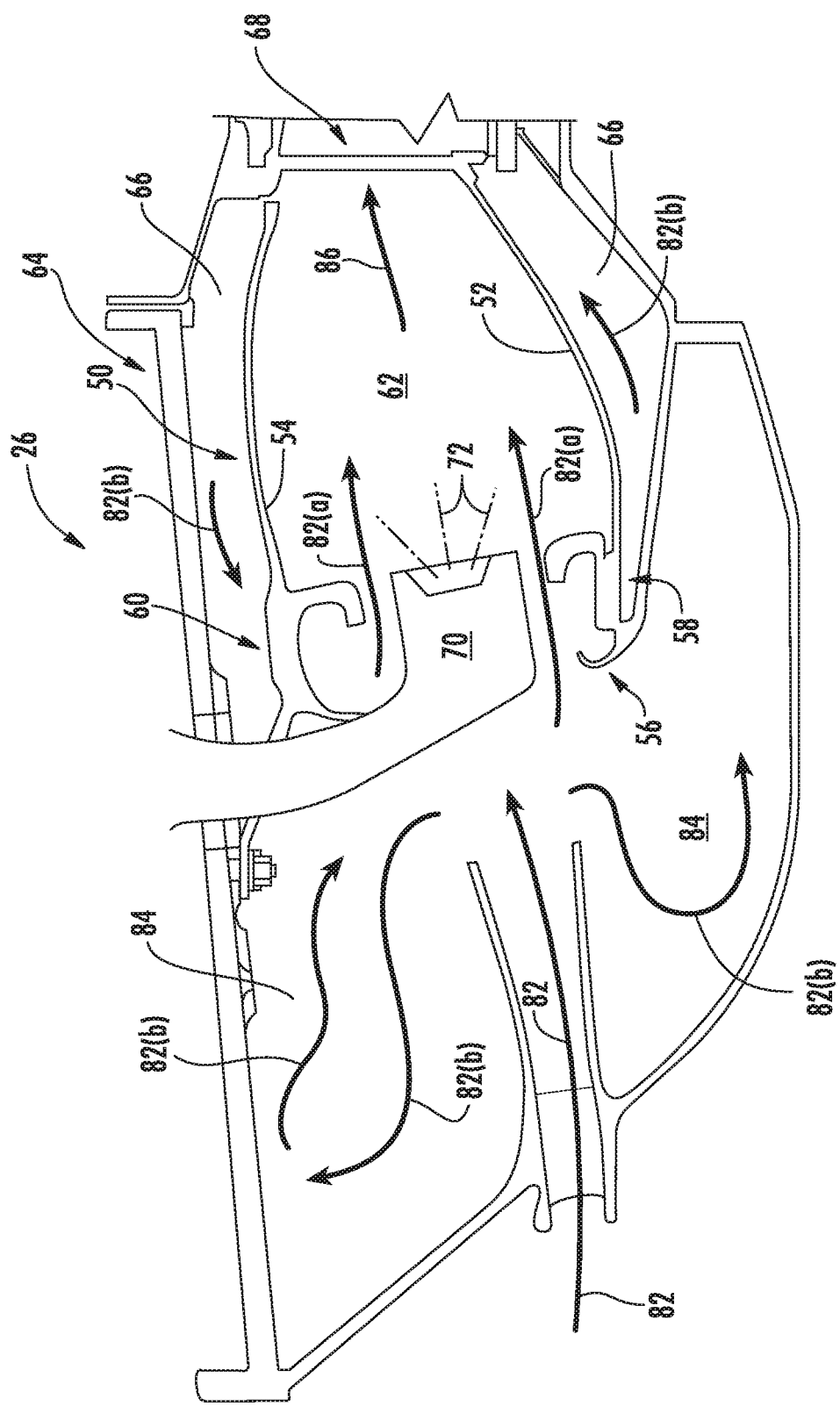
FIG. 2 is a cross sectional side view of an exemplary combustion section of the high by-pass turbofan jet engine as shown in FIG. 1.

FIG. 2 is a cross sectional side view of an exemplary combustion section 26 of the gas turbine engine 16 as shown in FIG. 1. As shown in FIG. 2, the combustion section 26 may generally include an annular type combustor 50 having an annular inner liner 52, an annular outer liner 54 and a generally domed end 56 that extends radially between upstream ends 58, 60 of the inner liner 52 and the outer liner 54 respectfully. As shown in FIG. 2, the inner liner 52 is radially spaced from the outer liner 54 with respect to engine centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within a combustor or outer casing 64. An outer flow passage 66 may be defined around the inner liner 52 and/or the outer liner 54. The inner liner 52 and the outer liner 54 may extend from the domed end 56 towards a turbine nozzle or inlet 68 to the HP turbine 28 (FIG. 1), thus at least partially defining a hot gas path between the combustor 50 and the HP turbine 28. A fuel nozzle 70 may extend at least partially through the domed end 56 and provides a fuel 72 to the combustion chamber 62. Other configurations of the combustion section 26 may be utilized.

During operation of the turbofan 10, as shown in FIGS. 1 and 2 collectively, a volume of air as indicated schematically by arrows 74 enters the turbofan 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows into a diffuser cavity or head end portion 84 of the combustion section 26.

The compressed air 82 pressurizes the diffuser cavity 84. A first portion of the of the compressed air 82, as indicated schematically by arrows 82(*a*) flows from the diffuser cavity 84 into the combustion chamber 62 where it is mixed with the fuel 72 and burned, thus generating combustion gases, as indicated schematically by arrows 86, within the combustor 50. Typically, the LP and HP compressors 22, 24 provide more compressed air to the diffuser cavity 84 than is needed for combustion. Therefore, a second portion of the compressed air 82 as indicated schematically by arrows 82(*b*) may be used for various purposes other than combustion. For example, as shown in FIG. 2, compressed air 82(*b*) may be routed into the outer flow passage 66 to provide cooling to the inner and outer liners 52, 54. In addition or in the alternative, at least a portion of compressed air 82(*b*) may be routed out of the diffuser cavity 84. For example, a portion of compressed air 82(*b*) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the gas turbine engine 16 to provide propulsive thrust.

As the fuel-air mixture burns, pressure oscillations occur within the combustion chamber 62. These pressure oscillations may be driven, at least in part, by a coupling between the flame's unsteady heat release dynamics, the overall acoustics of the combustor and transient fluid dynamics within the combustor 50. The pressure oscillations generally result in undesirable high-amplitude, self-sustaining pressure oscillations within the combustor 50. These pressure oscillations may result in intense, frequently single-frequency acoustic waves that may propagate within the generally closed combustion section 26.

Depending, at least in part, on the operating mode of the combustor 50, these pressure oscillations may generate acoustic waves at frequencies ranging from about 50 Hz to about 1000 Hz or even higher. These acoustic waves may propagate downstream from the combustion chamber 62 towards the high pressure turbine 28 and/or upstream from the combustion chamber 62 back towards the diffuser cavity 84 and/or the outlet of the HP compressor 24. In particular, as previously provided, low frequency acoustic waves (50-250 Hz) such as those that occur during engine startup and/or during a low power to idle operating condition and/or higher frequency waves (250-100 Hz) which may occur during takeoff and other operating conditions may reduce operability margin of the turbofan engine and/or may increase external combustion noise, vibration, or harmonics.

Figure 3:
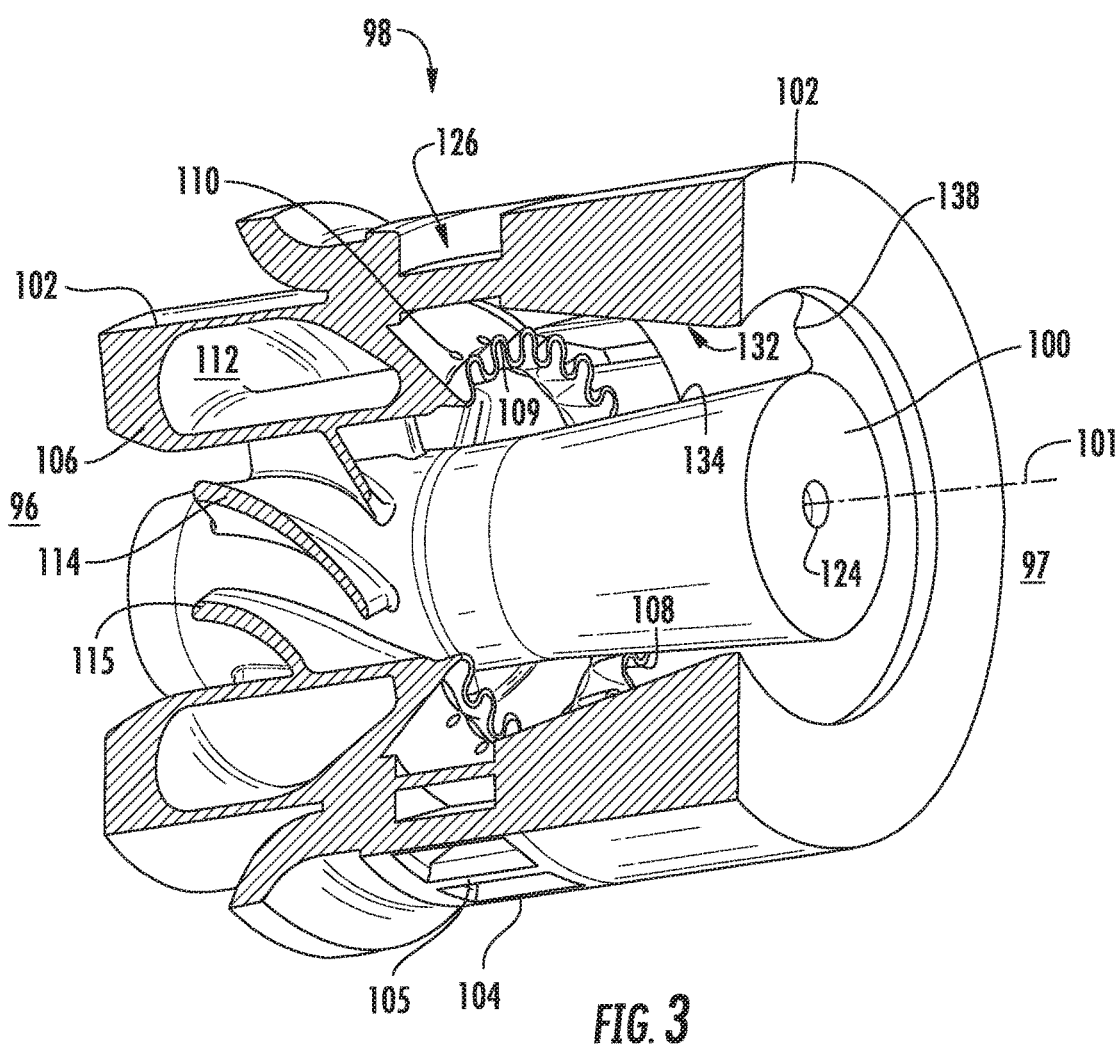
FIG. 3 is a profile partial-cutaway view of an exemplary gas turbine engine fuel injector assembly suitable for use within the combustion section shown in FIG. 2.

FIG. 3 is perspective view of an exemplary fuel injector assembly 98, with a portion of the outer sleeve 102 removed for viewing purposes, for use in a gas turbine engine combustion section 26 as shown in FIG. 2. The fuel injector assembly 98 includes a centerbody 100 and an outer sleeve 102 that generally surrounds the centerbody 100. The outer sleeve 102 defines at least one radially oriented vane 105, of which one or more vanes 105 forms a radial swirler 104. An inner sleeve 106 is disposed between the centerbody 100 and the outer sleeve 102. The inner sleeve 106, at least part of which is generally disposed upstream of the radial swirler 104, defines a contoured shroud 108.

Generally, the contoured shroud 108 is aerodynamically contoured to promote mixing of a liquid or gaseous fuel and air. For example, the contoured shroud 108 includes a plurality of lobes 109 positioned on the downstream end 97 of the inner sleeve 106.

Figure 4:
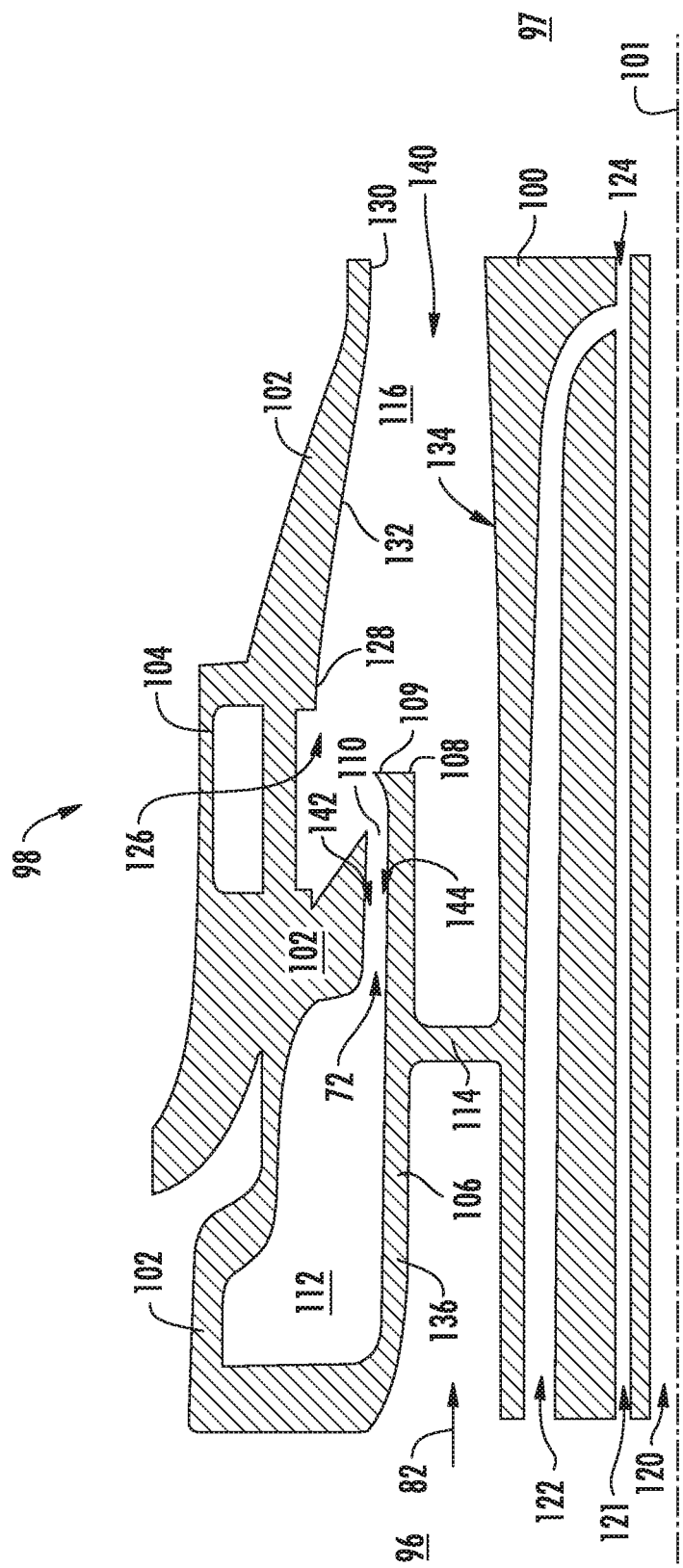
FIG. 4 is an axial cross-sectional view of the gas turbine engine fuel injector assembly of FIG. 3.

FIG. 3 and FIG. 4 together show the radial swirler 104 is disposed radially outward of the contoured shroud 108 and a fuel injection port 110. The fuel injection port 110 is defined between the inner sleeve 106 and a portion of the outer sleeve 102. As shown, at least one fuel injection port 110 is disposed upstream 96 of the contoured shroud 108.

The positioning of the radial swirler 104 to the contoured shroud 108 and fuel injection port 110 is such that compressed air 126 entering through a radial swirler 104 converges and mixes with a liquid or gaseous fuel 72 exiting a fuel injection port 110. The contoured shroud 108 may aid in positioning the fuel 72 exiting the fuel injection port 110 such that the convergence of air 126 through the radial swirler 104 may deliver high levels of fuel-air mixing while keeping fuel outside of the structural boundary layer of the fuel injector assembly 98.

Generally upstream 96 in the fuel injector assembly 98 from the contoured shroud 108, an outer surface 134 of the centerbody 100 and an inner surface 136 of the inner sleeve 106 define at least one axially oriented vane 115, of which one or more vanes 115 forms an axial swirler 114. Axial swirler 114 geometry may have any geometry between at least one outer surface 134 of the centerbody 100 and at least one inner surface 136 of the inner sleeve 106. The axial swirler 114 is not limited to any particular geometry, unless otherwise specified. Neither the centerbody 100 nor the inner sleeve 106 is bound to one diametric value for its entire structure. Furthermore, a centerbody 100 and subsequent surrounding features may have other radial cross-sectional forms, such as an elliptical or polygonal radial cross section.

The lobed structure 109 is generally positioned radially inward of a radial swirler 104. The lobed structure 109 is also positioned downstream relative to a fuel injection port 110. In another embodiment, the contoured shroud 108 is positioned generally upstream of an air flow path 126 introduced through a radial swirler 104. The lobed structure 109 of a contoured shroud 108 is disposed at the downstream end 97 of the inner sleeve 106.

FIG. 4 shows an axial cross sectional view of the exemplary fuel injector assembly 98 in FIG. 3. The relationship of the outer sleeve 102 and the centerbody 100 creates an annular circuit 116 for substantially the length of the centerbody 100. In the embodiment shown in FIG. 4, the radial cross-sectional area 138 of the annular circuit 116 from a first location 128 downstream of the radial swirler 104 is less than at a second location 130 downstream of the first location 128.

Figure 10:
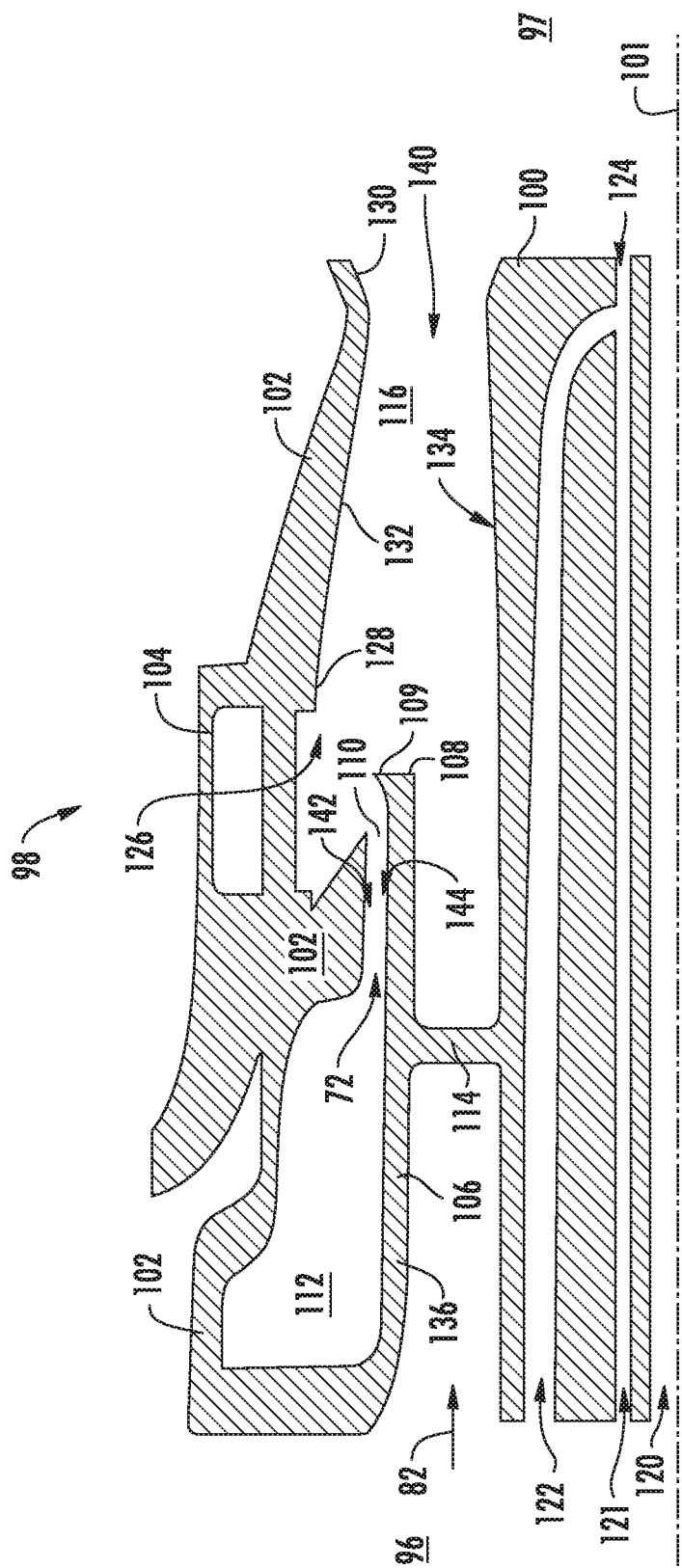
FIG. 10 is an axial cross sectional view of another embodiment of a fuel injector assembly according to an aspect of the present disclosure.

As shown in FIG. 4, the inner surface 132 of the outer sleeve 102 is converging toward the center axis 101 as the inner surface 132 extends downstream. Conversely, the outer surface 134 of the centerbody 100 is diverging from the center axis 101. As such, the radial cross sectional area 138 from a first location 128 to a second location 130 in the annular circuit 116 is decreasing. In other embodiments, either the inner surface 132 or the outer surface 134 may converge toward one another while one or the other remains generally neutral (i.e. not converging or diverging from the center axis 101). Referring to FIG. 10, in another embodiment, the axial area 140 of the annular circuit 116 is defined as convergent/divergent, in which the area from a first location 128 decreases downstream within the annular circuit 116 then increases in area before approaching a second location 130 at about the downstream end of the fuel injector assembly 98. It should be appreciated by one skilled in the art that aspects of either geometry, or a combination thereof, may be employed to decrease the area of the annular circuit 116 toward the downstream end of the fuel injector assembly 98. Additionally, the inner surface 132 of the outer sleeve 102 and the outer surface 134 of the centerbody 100 may be smoothed (e.g. ultra-polishing), rifled, or otherwise finished to reduce aerodynamic drag and promote acceleration of the mixed fuel 72 and air 82.

Referring to FIGS. 3 and 4, at least one fuel injection port 110 extends downstream from the fuel injection circuit 112. In an alternate embodiment, the fuel injection port 110 may extend at an angle relative to the center axis 101. Additionally, the fuel injection port 110 may extend non-linearly downstream from the fuel injection circuit 112, including a curved fuel injection port 110 pathway from the fuel injection circuit 112. In another embodiment where the fuel injection port 110 extends non-linearly, a first portion 142 that defines the fuel injection port 110 diverges or converges, or both, with a second portion 144 that defines the fuel injection port 110. Additionally, the fuel injection port 110 may have a generally circular opening or may be of an elliptical or polygonal opening. The first portion 142 and second portion 144 may be of finished surfaces (e.g. rifled or polished) to aid the flow of a liquid or gaseous fuel 72 through the fuel injection port 110. Alternatively, the downstream end of the fuel injection port 110 may be finished to aid fuel flow to the lobes 109 or the further aid in fuel separation before encountering air 82, 126.

The fuel injection circuit 112 may be bisected by a wall that splits the circuit 112 into two or more portions, where each portion is of a similar axial cross sectional area as shown in FIG. 4. In an alternate embodiment in FIG. 6, the fuel injector assembly 98 incorporates an internal wall 118 bisecting the fuel injection circuit 112 into two or more bisected fuel injection circuits 113 around substantially the entire annulus. A fuel injection port 110 egresses from the first fuel injection circuit 112 and a second fuel injection port 111 egresses from the bisected fuel injection circuit 113. The embodiment in FIG. 6 that includes the internal wall 118 may be coupled with the aforementioned bisected arrangement (i.e. the embodiment in FIG. 6 may also be split into two or more portions around the circumference of a fuel injector assembly 98) which can further multiply the quantity of fuel circuits 112, 113 and fuel injection ports 110, 111 that a single fuel injector assembly 98 may accommodate.

A liquid or gaseous fuel 72 is delivered from a fuel injection circuit 112 or bisected fuel injection circuit 113 to the fuel injection ports 110. The exemplary fuel injector assembly 98 is configured to inject either a liquid or gaseous fuel 72 through the fuel injection circuit 112 or one or more bisected fuel injection circuits 113. The fuel flow rate through the fuel injection circuit 112 or bisected fuel injection circuits 113 may be independently variable as a liquid or gaseous fuel 72 injects and mixes with compressed air 82. A liquid fuel 72 may be injected by an atomizer, in which the surface finish of the fuel injection circuit 112, 113 or the fuel injection ports 110, 111 promotes a pressure swirl. Additionally, the exemplary fuel injector assembly 98 may be configured for independent variable pressure settings or flow rates through each fuel injection circuit 112, 113 or fuel injection ports 110, 111. An independent pressure and flow configuration may include atomizer features, including air assist, effervescent, vibratory, electromagnetic, or a combination thereof.

In the embodiment shown in FIG. 4, the centerbody 100 includes a first centerbody circuit 120, a second centerbody circuit 121, and a third centerbody circuit 122 leading to at least one circuit outlet 124 to egress a fluid 125 (e.g. liquid or gaseous fuel, air, inert gas, or combination thereof). The second centerbody circuit 121 and the third centerbody circuit 122 are positioned generally co-axial to the first centerbody circuit 120. In another embodiment, the second centerbody circuit 121 or the third centerbody circuit 122 are tunnels within the centerbody (i.e. not annular cavities), radially outward from a first centerbody circuit 120. Any combination of centerbody circuits 120, 121, 122 may be fluidly connected toward the downstream end of the centerbody 100 before egressing through the centerbody outlet 124. In another embodiment, any centerbody circuit 120, 121, 122, or a combination thereof, may egress independently to a circuit outlet 124 without fluid interconnection. The exemplary fuel injector assembly 98 may be configured for independent variable flow rates within each centerbody circuit 120, 121, 122. It should be apparent to one skilled in the art that additional centerbody circuits (fourth, fifth . . . Nth) may be installed and arranged in substantially similar manner as the first 120, second 121, and third 122 centerbody circuits described herein.

Figure 5:
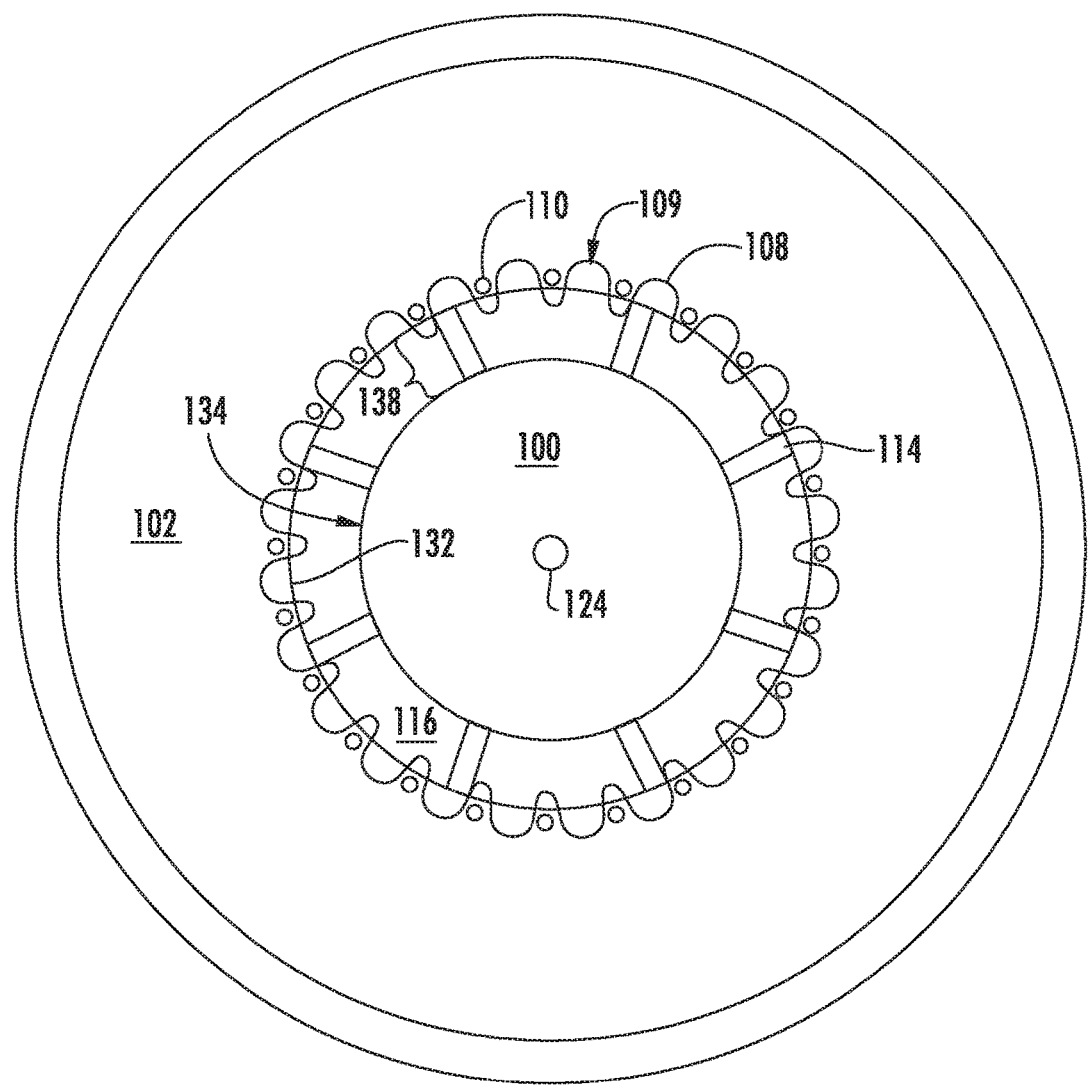
FIG. 5 is a radial cross-sectional view of the fuel injector assembly of FIG. 3.

FIG. 5 shows a radial cross section view of the exemplary fuel injector assembly 98 in FIG. 3 in which the relative location of a fuel injection port 110 to the lobes 109 of a contoured shroud 108 is shown as being positioned generally between circumferentially adjacent lobes 109. For the embodiment shown, the contoured shroud 108 generally defines a sine wave. The frequency, amplitude, or phase of the sine wave that defines the lobes 109 may be of a constant value throughout the contoured shroud 108. In alternative embodiments, the frequency, amplitude, or phase of the sine wave that defines the lobes 109 may be of several values around the circumference of the contoured shroud 108. In other embodiments, the lobes 109 may exhibit a non-sinusoidal waveform, such as triangle, saw tooth, square, trapezoid, exponential, or complex waveform. In yet other embodiments, the lobes 109 may exhibit a combination of a non-sinusoidal waveform and a variable frequency, amplitude, or phase around the circumference of the contoured shroud 108. In other words, the contoured shroud 108 may be circumferentially non-uniform. Additionally, in other embodiments, the waveform constituting the contoured shroud 108 may exhibit only a positive amplitude or only a negative amplitude. These waveforms and variations may aid in placing a fuel 72 such that it is sheared more effectively by compressed air 126 entering the radial swirler 104 or compressed air 82 passing the axial swirler 114. Additionally, these waveforms and variations may reduce combustion noise, vibrations, and harmonics.

Figure 6:
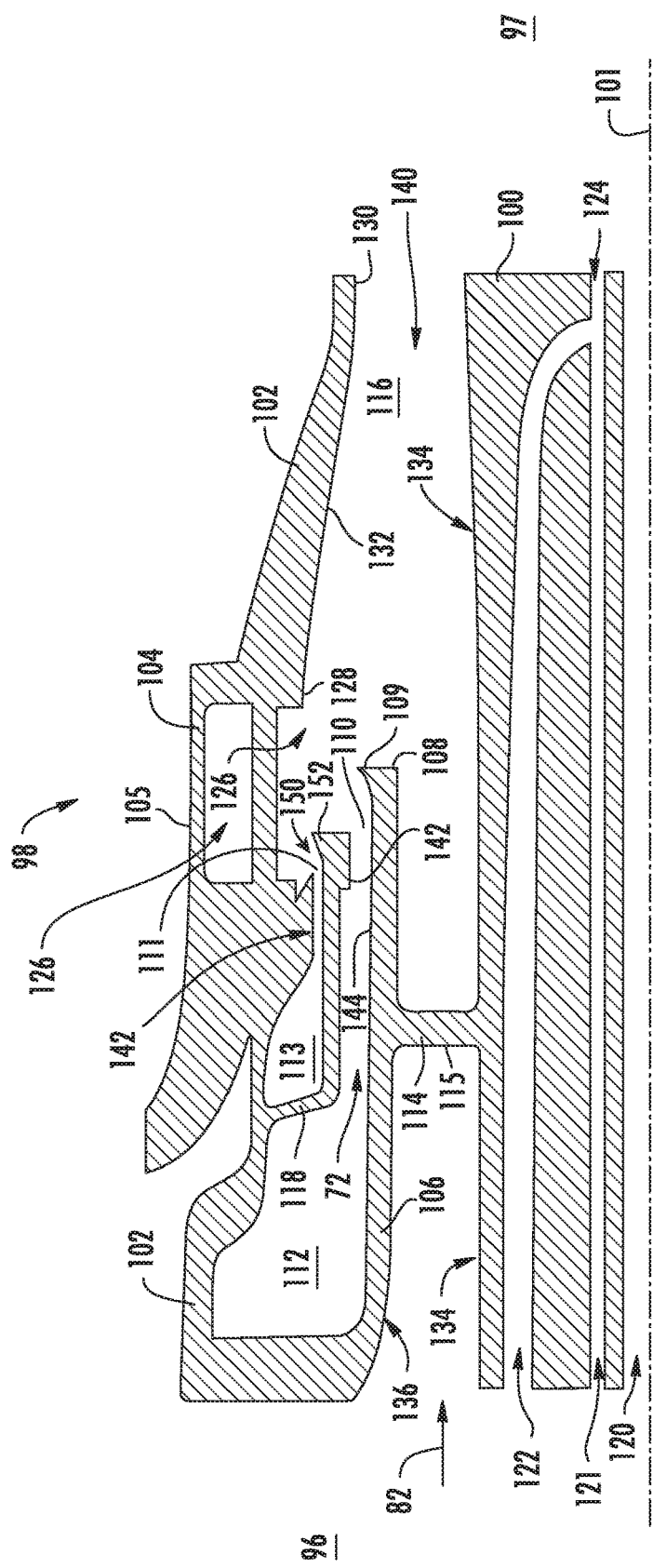
FIG. 6 is an axial cross-sectional view of the gas turbine engine fuel injector assembly of FIG. 3.

In the embodiment in FIG. 6, the internal wall 118 defines at its downstream end 97 a second contoured shroud 150 of a second plurality of lobes 152. The second contoured shroud 150 is disposed downstream 97 of the second fuel injection port 111 and is disposed between the outer sleeve 102 and the inner sleeve 106. The second contoured shroud 150 is disposed radially outward of the first contoured shroud 108.

Figure 7:
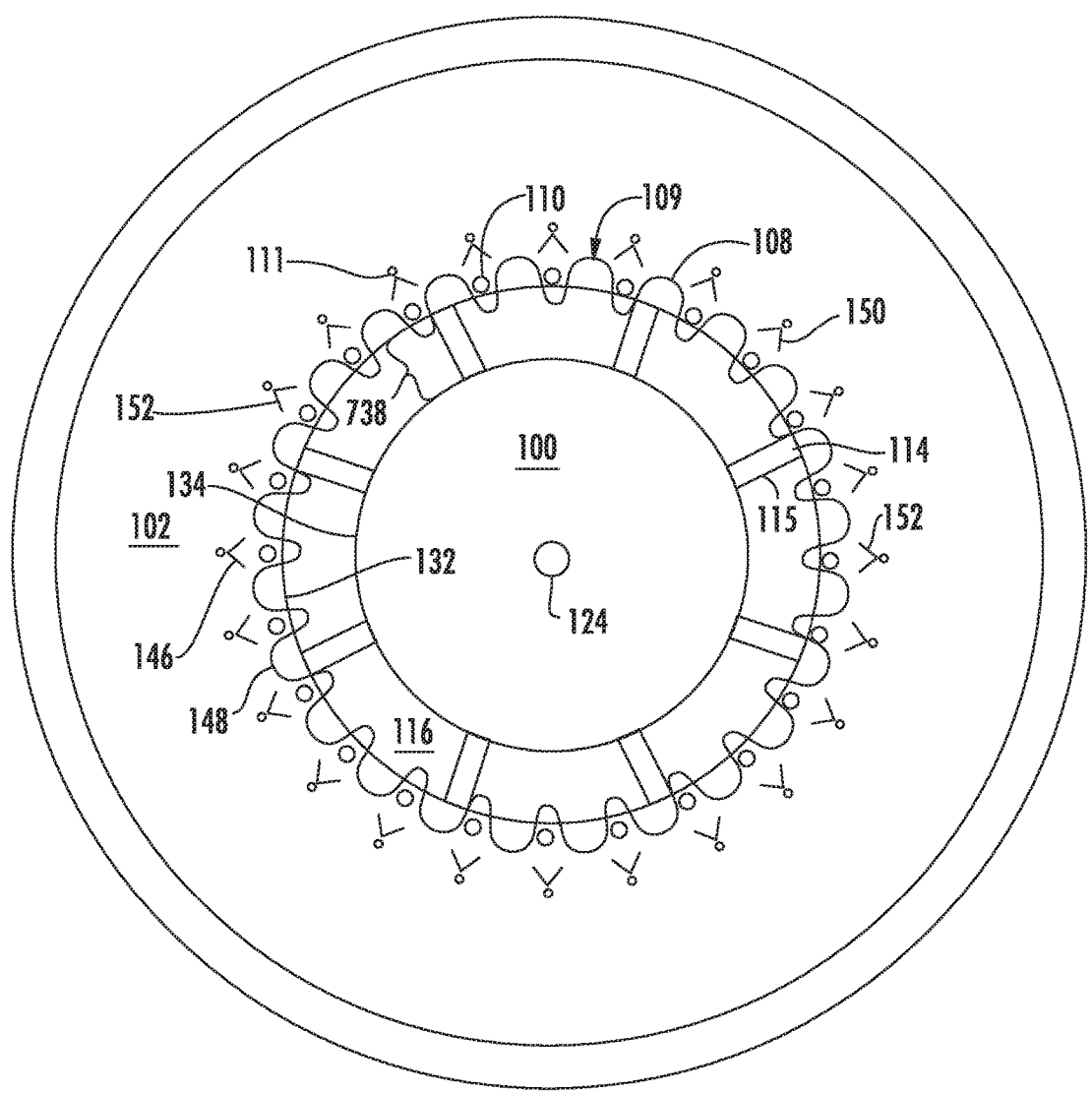
FIG. 7 is a radial cross-sectional view of the fuel injector assembly of FIG. 6.

In the radial cross sectional view in FIG. 7 of the embodiment of the fuel injector assembly axial cross section in FIG. 6, each plurality of lobes 109, 152 may exhibit a different waveform structure from one another, such as, but not limited to, a combination of a triangle waveform 146 or a sinusoidal wave 148. Though FIG. 7 shows an embodiment where the fuel injection ports 110, 111 are in general radial alignment, the fuel injection ports 110, 111 may be offset radially, including to the extent of full non-alignment. Waveform characteristic relationship between the first contoured shroud 108 and the second contoured shroud 150 may be the same or different each contoured shroud 108, 150. The phase of the second plurality of lobes 152 may be in line or offset from the first plurality of lobes 109. As previously disclosed in reference to the embodiment in FIG. 5, the waveforms, including type, frequency, amplitude, and phase, may vary around the circumference of each contoured shroud 108, 150 or differ within each contoured shroud 108, 150.

Figure 8:
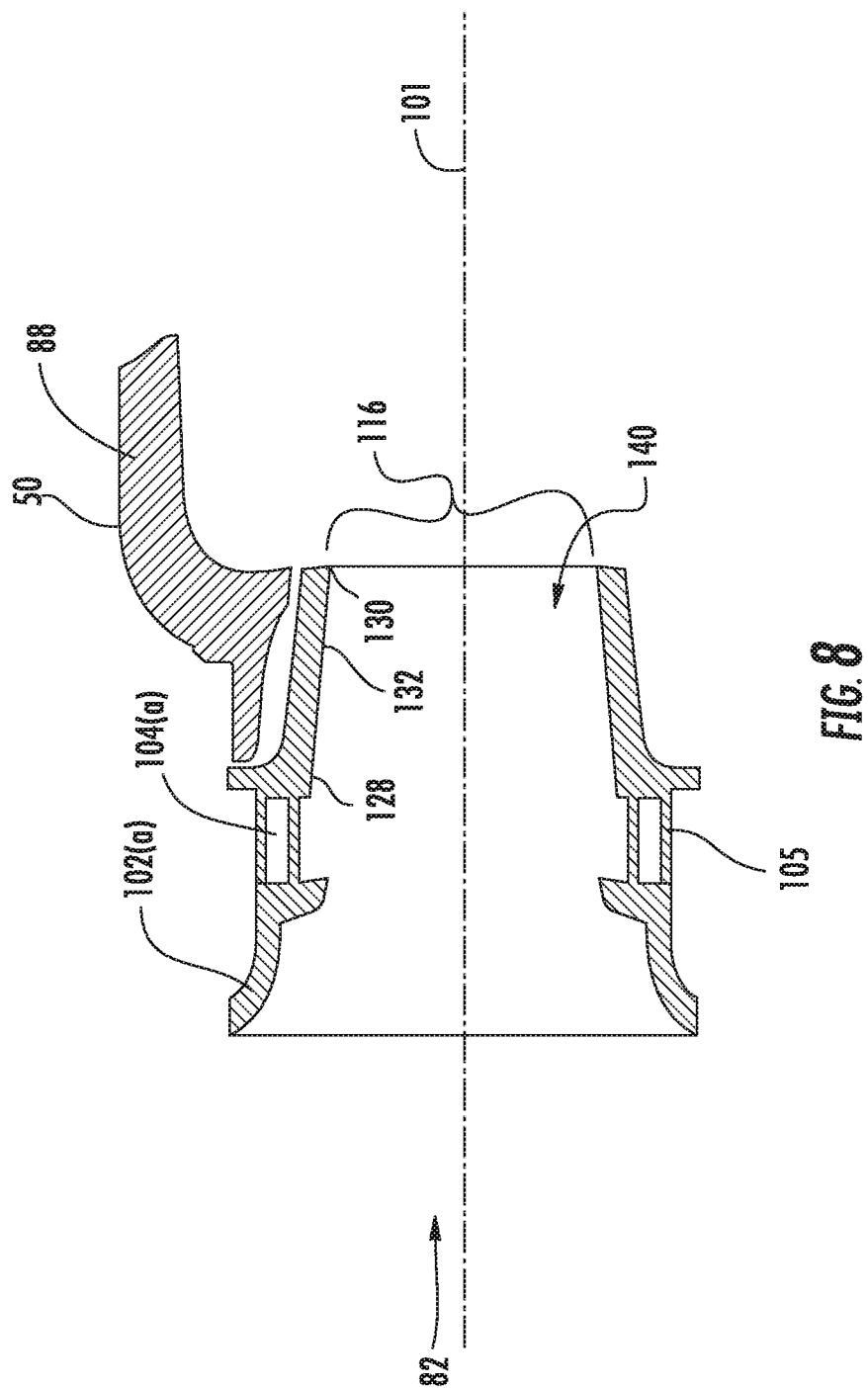
FIG. 8 is an axial cross-sectional view of an embodiment of a fuel injector assembly showing only a portion of the outer sleeve and a radial swirler mounted to a combustor bulkhead assembly.

In an embodiment shown in FIG. 8, a portion of the outer sleeve 102(*a*) is constructed and assembled onto a separate structure from the exemplary fuel injector assembly 98 in FIGS. 3-7. A downstream portion of the outer sleeve 102(*a*), including a radial swirler 104(*a*), may be constructed as a portion of, or assembled to, a combustor bulkhead assembly 88, separate from other constituent features of the fuel injector assembly 98. The combustor bulkhead assembly 88 would be part of a combustor assembly 50 for a gas turbine engine. The geometric relationship between a separate radial swirler 104(*a*) and aft outer sleeve portion 102(*a*) to all other features as shown in the embodiment in FIG. 9 would remain substantially the same as if constructed as a single, unitary fuel injector assembly 98.

Figure 9:
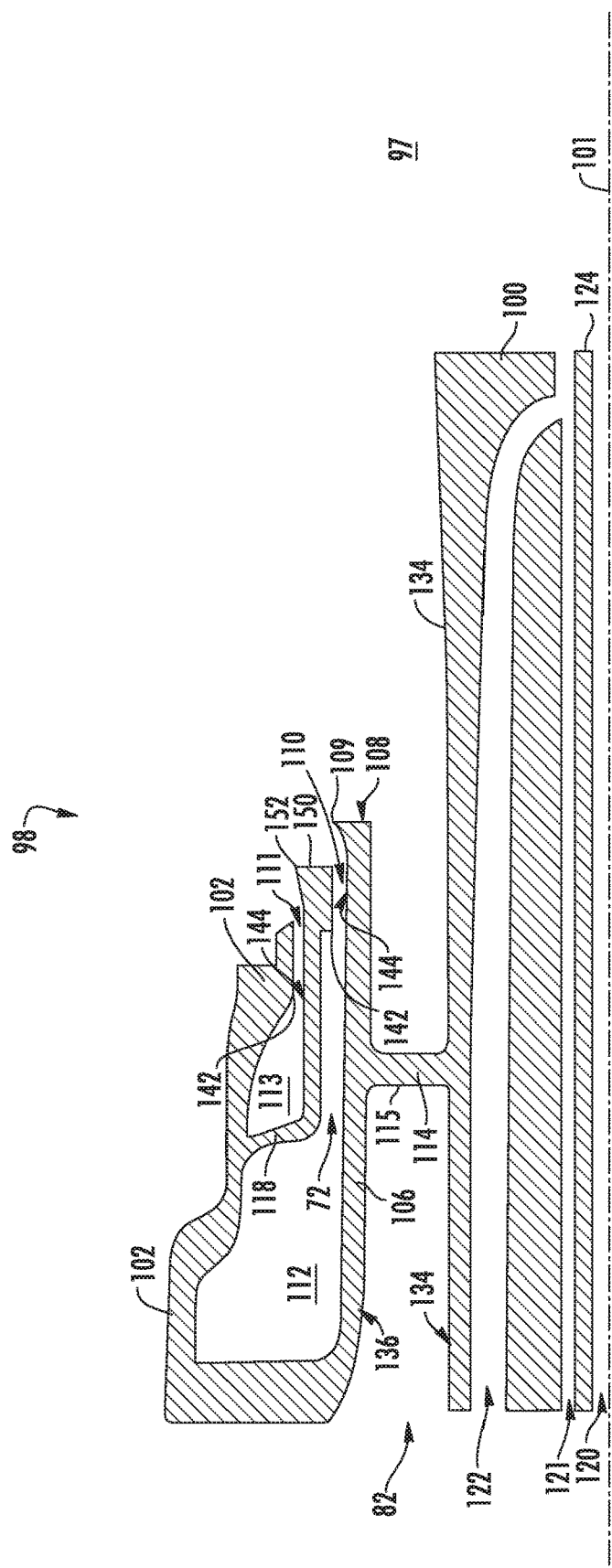
FIG. 9 is an axial cross sectional view of an embodiment of a fuel injector assembly showing only a fuel nozzle portion of the assembly shown in FIG. 6.

The embodiment in FIG. 9 shows a portion of the fuel injector assembly 98, referred to as a fuel nozzle 70, which may be installed into the separate radial swirler 104(*a*) and outer sleeve portion 102(*a*) shown in FIG. 8. The fuel nozzle 70 includes a centerbody 100, an inner sleeve 106, one or more contoured shrouds 108, 150, a portion of the outer sleeve 102, one or more fuel injection ports 110, 111, one or more fuel injection circuits 112, 113, and one of more axially oriented vanes 115 that define an axial swirler 114. The combination of the fuel nozzle 70 and the radial swirler 104(*a*) and the portion of the outer sleeve 102(*a*) installed onto the combustor bulkhead 88 shown in FIG. 8 would constitute the fuel injector assembly 98. Such a configuration may aid in varying fuel injector assemblies 98 within a combustor assembly 50 to improve overall combustor performance. Additionally, such a configuration may assist in assembling a fuel nozzle 70 into a combustor bulkhead assembly 88 or combustor assembly 50.

All or part of the fuel injector assembly 98 may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct the fuel injector assembly 98. Furthermore, the fuel injector assembly 98 may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include nickel and cobalt-based alloys.

The foregoing has described a fuel injector assembly for a gas turbine engine combustor assembly. All of the features disclosed in this specification (including any accompanying claims, abstract and drawings), and/or all of the steps of any method or process so disclosed, may be combined in any combination, except combinations where at least some of such features and/or steps are mutually exclusive.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel injector assembly of a gas turbine engine, comprising:
    a centerbody defining an outer surface;
    an outer sleeve surrounding the centerbody, wherein a section of the outer sleeve comprises a radially oriented vane, wherein the outer sleeve defines an inner surface, and further wherein the inner surface of the outer sleeve and the outer surface of the centerbody together define an annular circuit defining a decreasing cross sectional area from a first location to a second location downstream of the first location;
    an inner sleeve disposed between the centerbody and at least a section of the outer sleeve, wherein a portion of the inner sleeve comprises a contoured shroud, wherein the contoured shroud defines a plurality of lobes, and wherein the inner sleeve and a portion of the outer sleeve defines a fuel injection port disposed upstream of the contoured shroud, wherein the inner sleeve is disposed at least partly upstream of the radially oriented vane; and
    an axially oriented vane defined between the centerbody and a section of the inner sleeve, wherein the axially oriented vane is disposed upstream of the fuel injection port.

2. The fuel injector assembly as in claim 1 wherein the fuel injection port is aligned between circumferentially adjacent lobes of the plurality of lobes.

3. The fuel injector assembly as in claim 1 wherein the inner surface of the outer sleeve and the outer surface of the centerbody further define the annular circuit as a convergent/divergent annular circuit.

4. The fuel injector assembly as in claim 1, wherein the inner sleeve and the outer sleeve define a fuel injection circuit disposed upstream of the fuel injection port.

5. The fuel injector assembly as in claim 4, wherein an internal wall bisects the fuel injection circuit into two or more circuits.

6. The fuel injector assembly as in claim 5, wherein the internal wall and the outer sleeve define a second fuel injection port of a bisected fuel injection circuit.

7. The fuel injector assembly as in claim 1, wherein the centerbody comprises at least one or more circuits.

8. The fuel injector assembly as in claim 1, wherein the centerbody comprises a coaxial circuit of two or more circuits.

9. The fuel injector assembly as in claim 1, further comprising:
    a second contoured shroud disposed radially outward of the contoured shroud, and wherein the second contoured shroud is disposed generally at the downstream end of a second fuel injection port.

10. The fuel injector assembly as in claim 9, wherein the second contoured shroud is defined by a second plurality of lobes.

11. The fuel injector assembly as in claim 9, wherein the second fuel injection port is aligned between circumferentially adjacent lobes of a second plurality of lobes.

12. A combustion section, comprising a fuel injector assembly as in claim 1.

13. A gas turbine engine, comprising a combustion section as in claim 12.

14. A fuel nozzle, comprising:
   a centerbody defining an outer surface;
   an outer sleeve, at least partially surrounding the axial length of the centerbody, wherein the outer sleeve defines an inner surface, and further wherein the inner surface of the outer sleeve and the outer surface of the centerbody together define an annular circuit defining a decreasing cross sectional area from a first location to a second location downstream of the first location;
   an inner sleeve disposed radially outward of the centerbody, wherein a portion of the inner sleeve comprises a contoured shroud, wherein the contoured shroud defines a plurality of lobes, and wherein the inner sleeve and the outer sleeve defines a fuel injection port disposed upstream of the contoured shroud, wherein the inner sleeve is disposed at least partly upstream of a radially oriented vane; and
   an axially oriented vane defined between the centerbody and a section of the inner sleeve, wherein the axially oriented vane is disposed upstream of the fuel injection port.

15. A combustor assembly, comprising a fuel nozzle as in claim 14.

* * * * *